US009847034B1

(12) United States Patent
Plawecki

(10) Patent No.: US 9,847,034 B1
(45) Date of Patent: Dec. 19, 2017

(54) COMPLIANT AUTONOMOUS AIRCRAFT MANEUVERING

(71) Applicant: Daniel W. Plawecki, Ocala, FL (US)

(72) Inventor: Daniel W. Plawecki, Ocala, FL (US)

(73) Assignee: Northrop Grumman Systems Corporation, Falls Church, VA (US)

( * ) Notice: Subject to any disclaimer, the term of this patent is extended or adjusted under 35 U.S.C. 154(b) by 0 days.

(21) Appl. No.: 15/256,256

(22) Filed: Sep. 2, 2016

(51) Int. Cl.
  *G08G 5/00* (2006.01)
  *G08G 5/04* (2006.01)
  *H04L 29/08* (2006.01)
  *H04B 7/185* (2006.01)

(52) U.S. Cl.
  CPC ......... *G08G 5/0069* (2013.01); *G08G 5/0008* (2013.01); *G08G 5/0021* (2013.01); *G08G 5/0039* (2013.01); *G08G 5/045* (2013.01); *H04B 7/18506* (2013.01); *H04L 67/12* (2013.01)

(58) Field of Classification Search
  CPC .. G08G 5/0069; G08G 5/0021; G08G 5/0008; G08G 5/0039; G08G 5/045; H04L 67/12; H04B 7/18506
  See application file for complete search history.

(56) References Cited

U.S. PATENT DOCUMENTS

| 7,414,567 | B2 | 8/2008 | Zhang et al. |
| 8,031,105 | B2 | 10/2011 | Stayton |
| 8,665,985 | B1 | 3/2014 | Piesinger |
| 8,902,101 | B1 | 12/2014 | Sishtla et al. |
| 9,208,687 | B2 * | 12/2015 | Wang .................. G08G 5/0008 |
| 2009/0322587 | A1 | 12/2009 | Stayton |
| 2010/0311354 | A1 * | 12/2010 | Stayton .................... H04L 5/02 455/90.1 |
| 2010/0315282 | A1 | 12/2010 | Stayton |
| 2015/0338503 | A1 * | 11/2015 | Stayton ................. G01S 13/767 342/36 |
| 2016/0101855 | A1 * | 4/2016 | Stefani ................. G08G 5/0008 701/2 |
| 2016/0328983 | A1 * | 11/2016 | Hutchinson ............ G08G 5/045 |

\* cited by examiner

*Primary Examiner* — Michael J Zanelli
(74) *Attorney, Agent, or Firm* — Tarolli, Sundheim, Covell & Tummino LLP

(57) ABSTRACT

An aerial vehicle maneuvers in compliance with applicable aviation regulations by formulating a request to air traffic control (ATC) for permission to perform a proposed maneuver, overlaying, as a sub-modulated secondary signal, data characterizing the request on top of a primary ADS-B signal such that the primary ADS-B signal is not interfered with, and transmitting an ADS-B message comprising the primary and secondary signals. Permission can likewise be transmitted and received from ATC using ADS-B overlay communication. The aerial vehicle can conduct emergency maneuvers in the absence of permission and update ATC as to flight path deviations taken using ADS-B overlay communication, without the need for a voice radio and by using existing ADS-B digital communications.

20 Claims, 9 Drawing Sheets

COMPLIANT AUTONOMOUS AIRCRAFT MANEUVERING

GOVERNMENT INTEREST

This invention was made with government support under contract FA8650-08-D-3569 (AVIATR) DO 0020 awarded by the United States Air Force. The government has certain rights in the invention.

TECHNICAL FIELD

The present invention relates to navigation communication systems and more particularly to communication protocols for aerial vehicle navigation.

BACKGROUND

The aviation laws and regulations of many nations, including the United States, have created "highways" in the sky to which the flight paths of aircraft must conform. Except in emergency situations, aircraft may not deviate from approved flight paths without air traffic control (ATC) permission under Instrument Flight Rules (IFR). Such permission is conventionally requested and received from a local ATC facility with which an aircraft is in voice channel radio communication using onboard transmitter and receiver equipment. Traditionally, communications between any one aircraft and a corresponding local ATC facility occur over a line-of-sight communications path and over a dedicated frequency channel.

Aviation laws and regulations also prescribe requirements to avoid other aircraft. Airspace de-confliction describes the process of reducing the risk of a near mid-air collision. Although aircraft with conflicting routes may sometimes communicate and cooperate to adjust their routes and thus to avoid conflict, in some cases a conflicting aircraft cannot be contacted or is otherwise non-cooperative.

In the absence of an onboard pilot to perform conflict recognition and perform de-confliction communication, other operational or technical means are needed to detect and resolve potential airspace conflicts between aircraft. "Sense and avoid" systems in unmanned aircraft (UA) can assist in providing an acceptably safe means of compliance with regulations to detect and avoid other aircraft. These systems can be used for both self-separation and collision avoidance. Self-separation is the ability to remain "well clear" of other aircraft, typically through gentle, right-of-way compliant maneuvers. Collision avoidance is a function executed to prevent an imminent collision, and is typically more aggressive. The requirement to maintain "well clear" of other aircraft derives from regulatory language in U.S. Federal Aviation Regulations (FAR) governing general flight rules (14 C.F.R. §91.113).

Aircraft on IFR flight plans generally must ask for and receive permission to deviate from their planned flight paths, even to maneuver around traffic, unless a maneuver is needed to prevent a collision. A maneuver is considered to be needed to prevent a collision when the planned flight path would violate the well-clear distance, in view of information regarding the path of other aircraft.

ADS-B, which stands for Automatic Dependent Surveillance-Broadcast, is an Air Traffic Management and Control (ATM/ATC) surveillance system that was developed as a replacement for traditional radar-based systems for U.S. Next Generation Air Transportation System (NextGen)-like systems. An aircraft using ADS-B can determine its position via satellite navigation methodologies and periodically broadcast the determined position information, enabling the ADS-B-equipped aircraft to be tracked. For example, ADS-B avionics can broadcast messages over radio transmission links, approximately once per second, containing data signifying aircraft position, velocity, identification, and other ATC/ATM-related information. The data can be received by air traffic control ground stations as a replacement for secondary radar. It can also be received by other aircraft to provide situational awareness and allow self-separation and collision avoidance between airborne craft.

ADS-B is "automatic" in the sense that no pilot or controller action is required for the standard ADS-B information to be broadcast. It is "dependent surveillance" in the sense that the aircraft surveillance-type information is derived from on-board navigation equipment.

SUMMARY

In one example, there is provided a method of maneuvering an aerial vehicle in compliance with applicable aviation regulations. The method can include formulating a request to an air traffic controller for permission to perform a proposed maneuver. Next, the method can include overlaying, as a first sub-modulated secondary signal, data characterizing the request on top of a first primary Automatic Dependent Surveillance-Broadcast (ADS-B) signal such that the first primary ADS-B signal is not interfered with. The method can continue with transmitting a first ADS-B message comprising the first primary and secondary signals.

The method can further include overlaying, as a second sub-modulated secondary signal, data characterizing the proposed maneuver or an executed maneuver on top of a second primary ADS-B signal such that the second primary ADS-B signal is not interfered with. Then, the method can include transmitting a second ADS-B message comprising the second primary and secondary signals.

In another example, there is provided an onboard ADS-B communication system. The system can include at least one input from a satellite navigation system to provide position and trajectory information. The system can further include an ADS-B overlay communication system to encode a maneuver permission request and planned maneuver information as an ADS-B overlay message modulated on top of a primary ADS-B message without interfering with the content of the primary ADS-B message. The system can also include at least one radio frequency transmitter or at least one output to a radio frequency transmitter to transmit the ADS-B message including the ADS-B overlay message.

In yet another example, there is provided an air traffic control (ATC) system. The ATC system can include a digital interface to receive and decode an ADS-B message comprising at least one primary message and at least one secondary message, the secondary message encoded as an ADS-B overlay message sub-modulated within the primary message. The ATC system can further include one or more automated translators to convert the decoded secondary message to a language or format understandable as a maneuver permission request by a human ATC operator or an automated ATC system. The converted message can be, for example, one or more of a text message, a voice alert, or a visual indicator of a proposed maneuver or course change.

DETAILED DESCRIPTION

Figure 1:
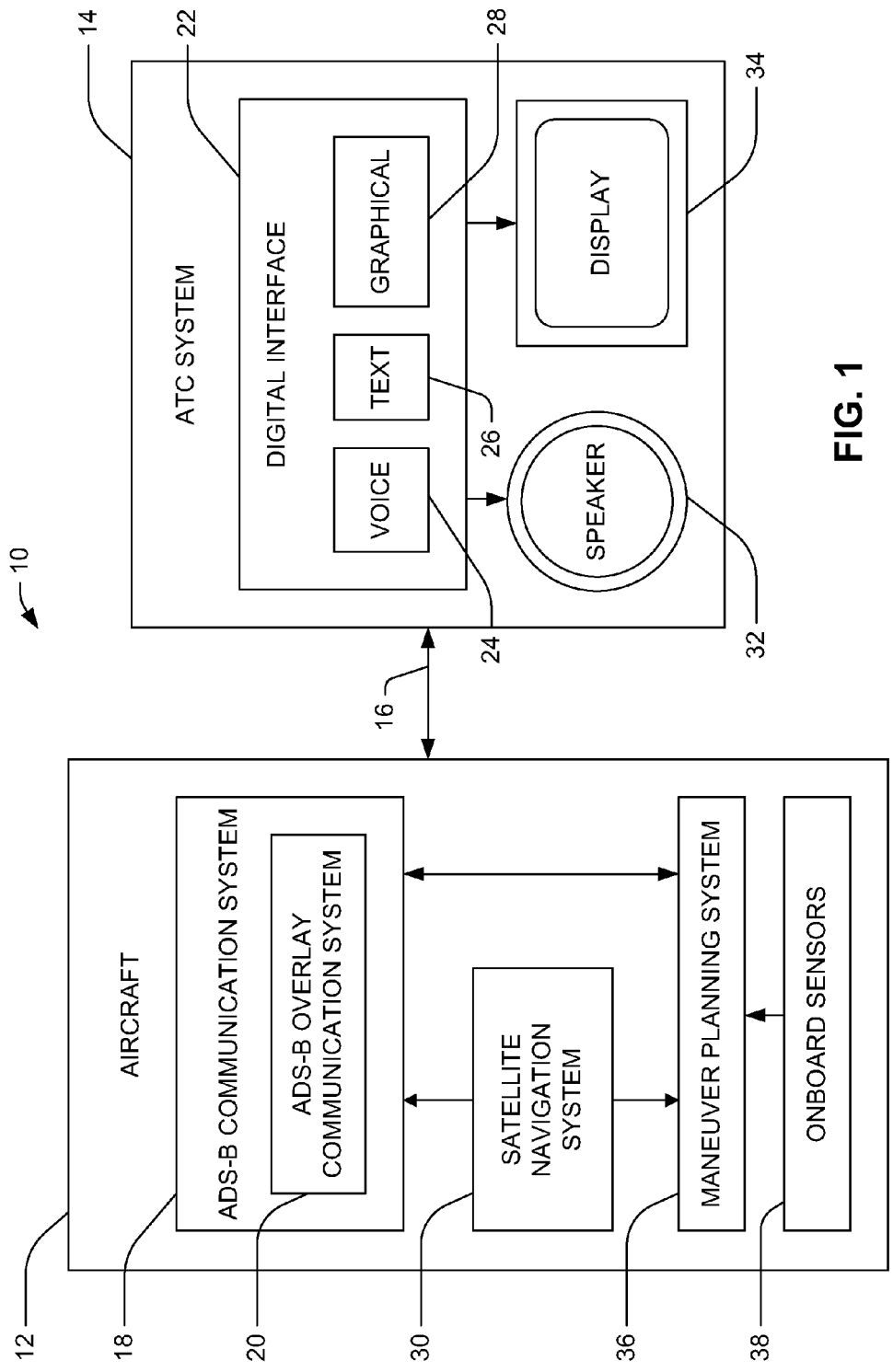
FIG. 1 illustrates an example of a system for ADS-B overlay communication between aircraft and air traffic control.

In compliance with aviation regulations of various jurisdictions, aircraft are generally required to communicate any intent to deviate from pre-filed flight plans to an air traffic control (ATC), and to receive permission for such deviation from the ATC prior to commencing any deviating maneuver. Such a need to maneuver may arise, for example, from an apparent collision course with another aircraft. Where an aircraft is manned or has good voice channel communication with a remote human pilot, such a request, and the subsequent permission, can often be communicated to the local ATC over traditional voice channels. However, autonomous unmanned aircraft may not be equipped to communicate using human speech, and even those that may be so equipped might not be successful in receiving, comprehending, or transmitting speech communication under failure conditions or radio communications limitations. Unmanned aircraft may be more aptly equipped to communicate through the transmission and receipt of digital data descriptions of various flight parameters. As such, existing systems do not readily permit autonomous unmanned craft and air traffic controllers to communicate with each other. Due to increasing limitations associated with the use of voice radio, successful voice communication with ATC will degrade over time as competition over available radio frequency allocations become more competitive and the volume of voice message traffic increases with an increase in air traffic. This disclosure therefore recognizes that integration of autonomous unmanned aircraft into controlled airspace systems that have been tailored for human-piloted craft may require new modes of communication so that unmanned craft can communicate maneuver intents and receive acknowledgements and permissions to perform maneuvers.

This disclosure provides methods and systems for an unmanned aircraft (UA) to ask for air traffic control (ATC) permission to maneuver by transmitting the intended maneuver track and to advise ATC and the ground control station (GCS) of an actual maneuver track once a last-chance maneuver is executed. Using such methods or systems, a UA can remain compliant with applicable aviation regulations, for example, Federal Aviation Regulations (FAR) Part 91 flight rules, even in the event of a loss of traditional communications channels, such as voice channels. This disclosure thus provides methods and systems that eliminate dependency on voice communication, permitting autonomous craft to transmit ATC maneuver requests and subsequently receive maneuver permission from ATC and thus providing integration of autonomous craft into current air traffic control systems without the use of voice communications.

In an example, an ADS-B carrier protocol overlay can be used to communicate UA intent-to-maneuver and actual-maneuver track to ATC when a maneuver is required to avoid traffic, as may be required by instrument flight rules (IFR) procedures, and/or to communicate the maneuver intent and track to a ground control operator in the event of a communications loss. An existing ADS-B radio frequency (RF) communication protocol can be overlain with a secondary message without interfering with a primary message. Thus, example systems and methods can take advantage of ADS-B channels to provide maneuver permission request and grant communications that would otherwise take place over voice channels unsuited for autonomous craft communications.

In an example method, a need to maneuver a UA can be determined in advance to prevent a collision. This need to maneuver can be communicated to an ATC facility via a secondary message protocol that can be associated with the aircraft squawk code. Using this protocol, the UA can first ask for advanced permission to maneuver per a planned track as determined by the UA on-board sense-and-avoid system. The UA can then wait for ATC approval to maneuver. Given ATC approval, the UA can then maneuver as communicated. In the absence of ATC approval, the UA can continue to ask permission until a "last-chance" maneuver is require to prevent a collision. The UA can then transmit into the blind the intended maneuver track until navigation is resumed or ATC acknowledges. The ground control station (GCS) is sent the same information.

The methods and systems described herein can help UA to remain compliant with FAR Part 91 flight rules in view of reliability issues associated with traditional RF communication including bandwidth limitations, contention, noise, etc. Traditional modes of communication may become more unreliable over time as competition for available bandwidth becomes more competitive. In view of the above, the described methods and systems can involve the addition of more active communications radios with diverse technologies and frequencies. Thus, the described methods and systems can be particularly useful when normal communications paths between GCS, UA, and ATC fail, or are unavailable or unreliable. In some examples, the described methods and systems can be also serve to eliminate the need for voice channel paths between GCS, UA, and ATC, promoting greater UA autonomy and alleviating the need for GCS supervision of UA resources.

FIG. 1 shows an example system 10 comprising an aircraft 12, which may be unmanned, and a system for air traffic control 14 in bidirectional communication with each other over a digital radio communications link 16. (In this disclosure, "link 16" refers to the digital radio communications link denoted by reference numeral 16 in the drawings, and not to the military tactical data exchange network known as "Link 16," used to communicate with NATO assets under the specification in the family of Tactical Data Links.) The bidirectional digital radio communications link 16 can be used to broadcast ADS-B messages but need not be capable of transmitting voice requests, instructions, or commands. Because of the range-improving capability of ADS-B messages to hop from aircraft to aircraft to reach an air traffic control station, the bidirectional digital radio communications link 16 need not be a direct link and need not be line-of-sight. As a result, system 10 can provide proposed-maneuver and emergency-maneuver information communications even in the absence of good voice-channel communications between aircraft 12 and its local air traffic controller.

Aircraft 12 can include an ADS-B communication system capable of receiving and transmitting information including, for example, spatial coordinates from onboard satellite navigation system 30 and transmitting such information over link 16 using normal ADS-B modulation. Aircraft 12 may further include onboard sensors 38 such as, for example, video camera(s) or radar or lidar detectors capable of detecting other aircraft entering a surveillance volume surrounding aircraft 12.

Aircraft 12 can also include a maneuver planning system 36 capable of planning changes in courses that can be translated into control surface and propulsion control by, for example, an autopilot, a collision avoidance system, or another automated aircraft control (not shown), or in some instances by a human pilot, whether onboard or remote. The maneuver planning system 36 can be fed information from any onboard sensors 38 or communications systems, including from ADS-B communication system 18, which information can be indicative or predictive of paths of other aircraft and thus indicative or predictive of the aircraft 12 violating "well clear" requirement with the other aircraft, or indicative or predicting of a likely collision with the other aircraft. The maneuver planning system 36 can then plan a course to avoid violating the "well clear" requirement or averting imminent likely collision, and can communicate the proposed de-conflicting maneuver or last-chance avoidance maneuver in advance of or contemporaneous with the execution of the maneuver to the ADS-B communication system 18, to an onboard or remote human pilot, or to other systems within aircraft 12.

Requests to maneuver and reports of executed maneuvers, to be sent to ATC, can be formulated either by maneuver planning system 36 or by ADS-B communication system 18.

Such formulation can include arranging either or both of maneuver requests (i.e., operational demands for the performing aircraft relating to identified desired or necessary course changes) and maneuver data (i.e., data characterizing proposed or executed maneuvers) in sequences suitable for transmission in ADS-B overlay messages in accordance with one or more protocols.

Maneuver planning system 36 can also receive information from ADS-B communication system 18 indicative of rejection of a proposed maneuver, as may be communicated from ATC system 14. In such case, maneuver planning system 36 can re-evaluate the risk of violating a "well clear" requirement or of imminent likely collision, can plan an alternate maneuver different from earlier proposed maneuvers, and can communicate the new maneuver to the ADS-B communication system 18 and/or to other system(s) and/or pilot(s).

Maneuver planning system 36 can make use of known methods for collision avoidance maneuver planning. A simple example of such a method may be directing aircraft 12 on a new course orthogonal or oblique to a known, determined, or predicted course of a non-cooperative aircraft, maintaining the new course for a time sufficient to keep "well clear" or to avoid collision, and thereafter directing aircraft 12 back to its original course.

the ADS-B protocol has the ability to overlay messages on a sub-carrier level. ADS-B communication system 18 in aircraft 12 can include ADS-B overlay communication system 20 capable of encoding information that may not be within the standard ADS-B protocol on top of an ADS-B signal as overlay modulation. Consequently, ADS-B communication system 18 can transmit not only ADS-B messages but other messages using ADS-B channels in the overlay signal without interfering with or disrupting primary ADS-B messages and without consuming other radio frequency (RF) resources, without requiring other RF channels, and without needing a line of sight between aircraft 12 and its local air traffic controller. As an example, ADS-B overlay communication system 20 can encode a proposed de-conflicting maneuver generated by maneuver planning system 36 into an overlay message for transmission with a primary ADS-B message from aircraft 12 to ATC system 14 over link 16 via ADS-B communication system 18.

In communication using ADS-B overlay, a secondary signal (e.g., a low level M-ary Quadrature Amplitude Modulation (M-QAM) signal)) can be submodulated over a pulse-position modulation (PPM) primary signal (e.g., a Mode S transponder signal) at, for example, a Mode S transponder transmitter or at a stand-alone ADS-B system of an aerial vehicle to communicate additional information to air traffic control (ATC) from the aerial vehicle. When a secondary signal is selected, it can be selected such that when summed with the PPM primary signal, the PPM primary signal still conforms to existing primary signal system specifications (e.g., those expected by existing Mode S transponder receivers or ADS-B receivers). When the secondary signal is summed with the PPM primary signal, an amplitude and phase of the PPM primary signal can be altered.

ATC system 14 in FIG. 1 can include a digital interface 22 capable of decoding the ADS-B overlay messages sent over link 16 and translating them into formats understandable by other components within the ATC system or human personnel. For example, a request to maneuver from aircraft 12 can be overlain on an ADS-B signal is received by ATC system 14 which then interprets the digital-data request to maneuver into a language or format that a human ATC operator or an automated ATC system can understand, which may be, for example, one or more of a text message, a voice alert, a visual indicator on radar screen, or other audible, readable, or visual indicators. The visual indicator may be, for example, a visually rendered path indicating a proposed maneuver or course change.

For example, digital interface 22 may include a voice translator 24 capable of converting the information in a received ADS-B overlay message into a voice message using, for example, a natural language formulator and a text-to-speech synthesizer. Such a voice message can be played, for example, over speaker 32. In such a way, a human air traffic controller can receive a flight plan deviation permission request or other flight information from aircraft 12 in a manner that resembles a voice communication from a human pilot of a manned aircraft, even without a human pilot or remote operator transmitting a voice message from, or relaying a voice message through, aircraft 112.

As another example, digital interface 22 in ATC system 14 in FIG. 1 may include text translator 26 capable of re-encoding information received in an ADS-B overlay message from aircraft 12 into a text message readable by an automated system or an air traffic controller. Such a text translator may use a natural language formulator to encode the information in a human-understandable message in a language readable by air traffic control personnel. The text message may be output for reading on, for example, a display 34.

As another example, digital interface 22 in ATC system 14 in FIG. 1 may include graphical translator 28 capable of re-encoding information received in an ADS-B overlay message from aircraft 12 into graphical information understandable by an automated system or viewable on a screen, such as display 34. Examples of graphical renderings of the received ADS-B overlay messages include points indicating aircraft positions or paths indicating present courses and/or proposed course deviations on a radar screen, or renderings of such points or paths in a virtual three-dimensional space that can be viewed and navigated through by air traffic control personnel. Display 34 may be a two-dimensional or three-dimensional display.

For the purposes of this disclosure, digital bitstreams, binary waveforms, and machine code are not "understandable by a human ATC operator." Similarly, such representations are not "understandable by an automated ATC system" unless expressed in a format readable by the particular automated ATC system. In the description and claims herein, a raw ADS-B overlay message is not in a format understandable by a human ATC operator or an automated ATC system.

The digital interface 22 of ATC system may also convert communications from air traffic controllers into ADS-B overlay signals that can be transmitted over ADS-B link 16 for receipt by aircraft 12. Such communications can then be understood by maneuver planning system 36 or other systems aboard aircraft 12. ATC system 14 can provide for conversion of air traffic controller communications into such digital communications. For example, ATC system can include a speech recognition system to translate a human-language voice message approval or disapproval of a proposed maneuver or route into a digital message capable of being overlain on ADS-B and understandable by maneuver planning system. As another example, ATC system can convert proposed alternative course change directives into digital information that can be overlain on an ADS-B signal for transmission to aircraft 12. Such ATC communications or directives can by input into the ATC system 14 vocally, by keyboard, or by any other input device.

ATC system 14 in FIG. 1 can thus include other devices and equipment (not shown) for receipt, processing, and output of air traffic control information, such as, for example, one or more processors, non-transitory memories for storing machine-readable instructions and data, computer displays, loudspeakers, headphones, radio transceivers, network connection interfaces, and radar equipment inputs. ATC system 14 can also include (not shown) devices for operator input, such as, for example, one or more mouses, styluses, trackballs, or other pointing devices, keyboards, touch screens, microphones, or telephony interfaces. ATC system can also include a graphical user interface (GUI) by which communications from aircraft 12 can be read, displayed, visualized, or manipulated, and by which directives and commands can be entered for transmission back to aircraft 12.

Similarly, ADS-B communication system 18 in FIG. 1 can likewise include (not shown) one or more processors, non-transitory memories, RF transceivers, interfaces, GUIs, and input and/or output devices, including those listed above. When aircraft 12 is manned or remotely piloted, onboard or remote human pilots or other aircraft personnel can use ADS-B communication system 18 and its ADS-B overlay communication system 20 to communicate with local air traffic control using ADS-B messages as carriers for messages outside the normal ADS-B protocol, and can do so without inferring with primary ADS-B messages, consuming additional RF resources, or requiring line-of-sight communications.

Figure 2A:
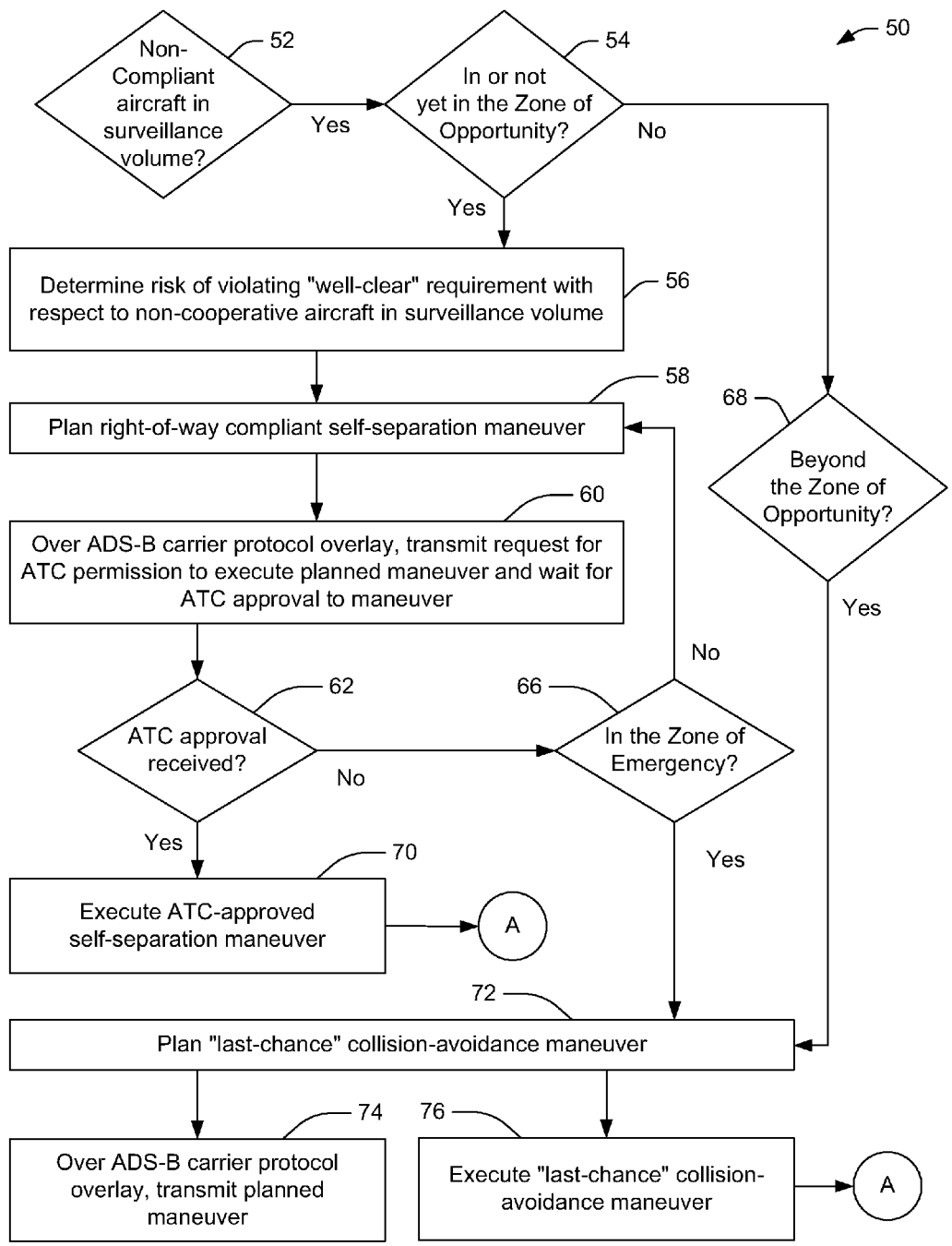
FIGS. 2A and 2B are a flow chart showing a method for compliant maneuvering and communication using ADS-B overlay.
Figure 2B:
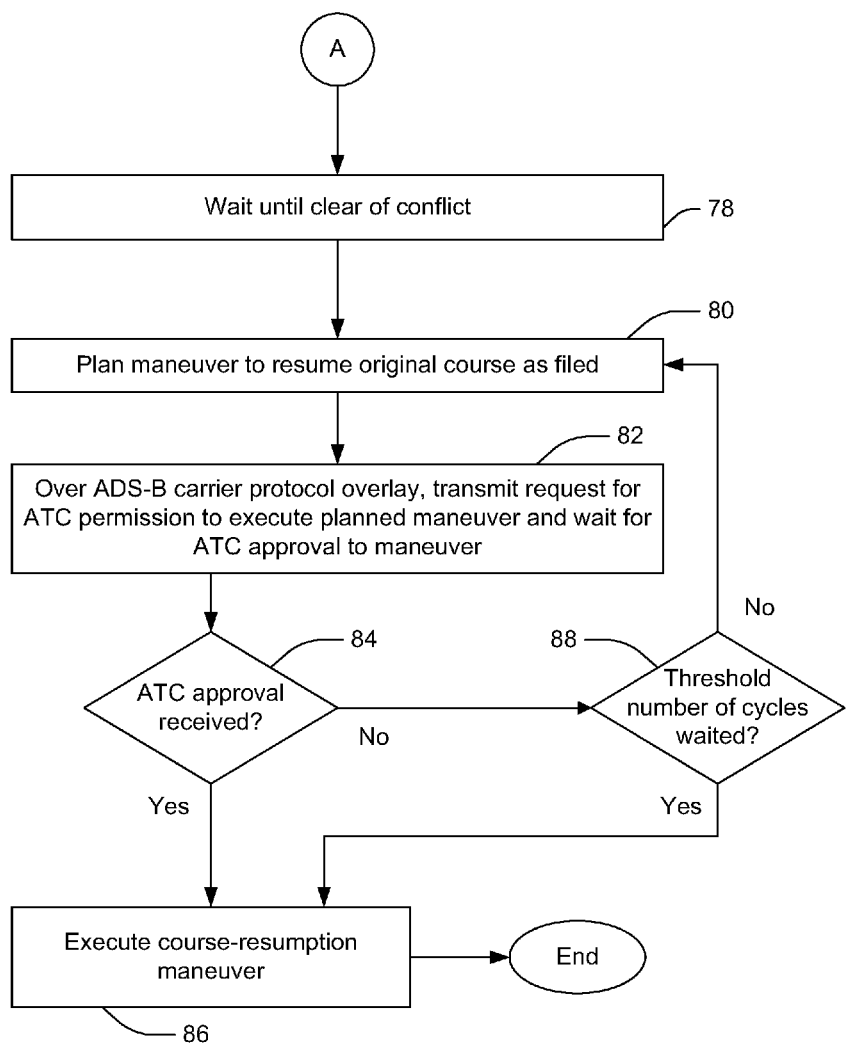

FIGS. 2A and 2B show an example compliant maneuvering and communication method 50 that can be performed by an automated system onboard an aircraft, such as aircraft 12 in FIG. 1, even in the absence of voice channel communications with a local air traffic controller, such as an air traffic controller equipped with ATC system 14 in FIG. 1.

The maneuvering and communication method 50 can begin 52 when a non-cooperative aircraft enters a surveillance volume surrounding the aircraft performing the method. The envelope of the surveillance volume can depend on such factors as speed of the performing aircraft and sensor and communications capabilities of the performing aircraft. In any case, the extent of the surveillance volume is sufficient to timely detect a risk of a "well-clear" violation and perform a de-conflicting maneuver.

The maneuvering and communication method 50 can continue with a determination 54 whether there is still time for the performing aircraft to conduct a de-conflicting maneuver, i.e., if the performing aircraft is in, or not yet in, the volume of airspace known as the "zone of opportunity." If there is sufficient time to de-conflict, then the method can proceed with the determination 56 of a risk of violating a "well clear" requirement with respect to the non-cooperative aircraft in the surveillance volume. Whether or not the performing aircraft is in, or not yet in, the zone of opportunity can depend upon the distance between the performing craft and the non-cooperative aircraft, and/or the respective speeds and trajectories of each.

This determination 56 can involve the aircraft that is performing the method understanding a known, predicted, or likely path of a non-cooperative aircraft that falls within a certain distance threshold of a known, predicted, or likely future position of the performing aircraft. The particular threshold distance can be programmed as dictated by aviation regulations applicable to the airspace in which the performing aircraft is operating. The particular threshold distance thus may be dependent on the spatial position of the performing aircraft, which in turn may be determined, for example, by a satellite navigation system, such as satellite navigation system 30 in FIG. 1.

The known, predicted, or likely path can be informed by sensors aboard the performing aircraft, such as onboard sensors 38 shown in FIG. 1, including, for example, video cameras, radar detectors, or lidar detectors. The known, predicted, or likely path can be also be informed by position-informing or course-informing signals from the non-cooperative aircraft, air traffic control, or a remote aircraft control station, whether transmitted over ADS-B channel(s), voice channel(s), or otherwise; or by known flight plans stored in a memory. Predicted or likely paths can also be informed by information about weather or turbulence, geographic features such as mountains or tall structures, or other known or predicted aircraft paths, hazards, or obstacles that one or both of the performing aircraft and the non-cooperative aircraft may likely seek to avoid. Predicted or likely paths can be extrapolated from known position and speed information and may use other material information, such as the types of information listed above, as constraints.

The determined risk informs the planning 58 of a right-of-way compliant separation maneuver, i.e., informs the immediacy and severity of the maneuver, as very little risk may permit for a very minor or delayed course adjustment whereas a high risk may demand a more timely or drastic deviation from the performing aircraft's filed flight plan. The risk determination 56 and maneuver planning 58 can be performed, for example, by maneuver planning system 36 as shown in FIG. 1.

The request to perform the planned maneuver, including the details of the proposed course change, is then transmitted 60 to the local air traffic control over ADS-B carrier protocol overlay, and the performing aircraft waits for ATC approval to perform the proposed maneuver. The amount of time waited may be a predetermined wait time, may be dictated by such factors as aircraft speed, air traffic, weather, ADS-B transmission effectiveness, and/or may be based on the determined risk and/or determined necessity for immediacy of the planned maneuver. In some examples, the amount of time waited may be more than five minutes. In some examples, the amount of time waited may be five minutes. In some examples, the amount of time waited may be one minute. In some examples, the amount of time waited may be ten seconds. In some examples, the amount of time waited may be one second. In some examples, the amount of time waited may be less than one second.

If ATC approval is received 62, then the performing aircraft can execute the ATC approved self-separation maneuver 70 and the de-confliction is complete. The method continues in FIG. 2B, which illustrates the course resumption phase 51 of the method. If ATC approval is not timely received, and the performing aircraft is not yet in the zone of emergency 66, the performing aircraft can re-evaluate the conflict situation and reconsider its self-separation maneuver 58, which can happen a number of times until ATC approval is received 62 or until the performing aircraft enters the zone of emergency 66. "ATC approval" in any case may not consist of approval of the proposed maneuver but may instead consist of instructions to perform an alternate maneuver, which instructions may similarly be communicated over an ADS-B link such as link 16 illustrated in FIG. 1. Under such circumstances, the performing aircraft can receive the ATC-approved alternate maneuver 62 and execute 70 that maneuver.

If, however, ATC approval is not received until the performing aircraft has entered the zone of emergency 66, action is required to avoid a collision with or without approval. Even with no maneuver permission from ATC, the performing aircraft can plan 72 and execute 76 a "last-chance" collision avoidance maneuver. In some examples, such a maneuver can be autonomously invoked by, for example, the maneuver planning system 36 shown in FIG. 1. The performing aircraft can continuously advise 74 ATC, until acknowledged, of the required maneuver. The performing aircraft can send such advisements over ADS-B overlay. In this way, the performing aircraft can maneuver to preserve safe flight and can prevent a conflict from propagating to a collision in the event that permission to maneuver cannot be obtained from ATC.

Following a de-confliction or collision avoidance maneuver, the performing aircraft can return to its prior course in course resumption phase 51 of the method as illustrated in FIG. 2B. The performing aircraft waits until it is clear of conflict 78, as may be determined by the measured or estimated distance between, and respective trajectories of, the performing aircraft and the non-cooperative aircraft, by communications from ATC and/or non-cooperative aircraft indicating clearance, or otherwise.

Once clear of conflict, the performing aircraft can plan 80 a maneuver to resume its original course as filed and transmit 82 a request for ATC permission to execute the planned maneuver to ATC. The transmission can be over ADS-B carrier overlay protocol, and can include detailed information regarding the maneuver. Once ATC approval is received 84, which approval may be for the proposed maneuver or a different maneuver communicated from ATC to the performing aircraft, the performing aircraft can execute 86 the ATC-approved course resumption maneuver, and the method ends. If, however, ATC approval is not timely received, the performing aircraft can reconsider 80 its course-resumption maneuver and re-request 82 ATC permission a number of times.

After a threshold number of times, the performing aircraft can determine that it is out of communication with the ATC and that permission to resume its course may not be forthcoming. In such a case, the performing aircraft can elect 88 to execute its course-resumption maneuver. The threshold number of cycles to be waited can be adjusted based on the distance that the performing aircraft has deviated from its original planned flight path, and can vary depending upon whether the initial maneuver executed was a de-confliction maneuver 70 or an emergency "last-chance" collision-avoidance maneuver 72. In the latter case, the threshold number may be lower, in some instances as low as zero, permitting the performing aircraft to resume its initial course immediately after performing a collision avoidance maneuver when it appears that no communication with ATC has been possible. In some examples, the planned course-resumption maneuver can be autonomously invoked by, for example, the maneuver planning system 36 shown in FIG. 1.

In some examples the steps describe above can be performed by automated systems onboard a performing aircraft. In other examples the steps described above can be performed by a human pilot. The method can thus provide for de-confliction and collision avoidance even in the absence of voice channel communication between the performing aircraft and ATC. The continual communication from performing aircraft to ATC even under emergency maneuver conditions provides ATC with enhanced updated situational awareness. In examples where the performing aircraft is an unmanned aircraft out of communication with its remote operator or control station, the unmanned aircraft can buffer events, including the various detections, planned maneuvers, executed maneuvers, and ATC communications, and later transmit them to its remote operator or control station once communications are re-established.

Figure 3:
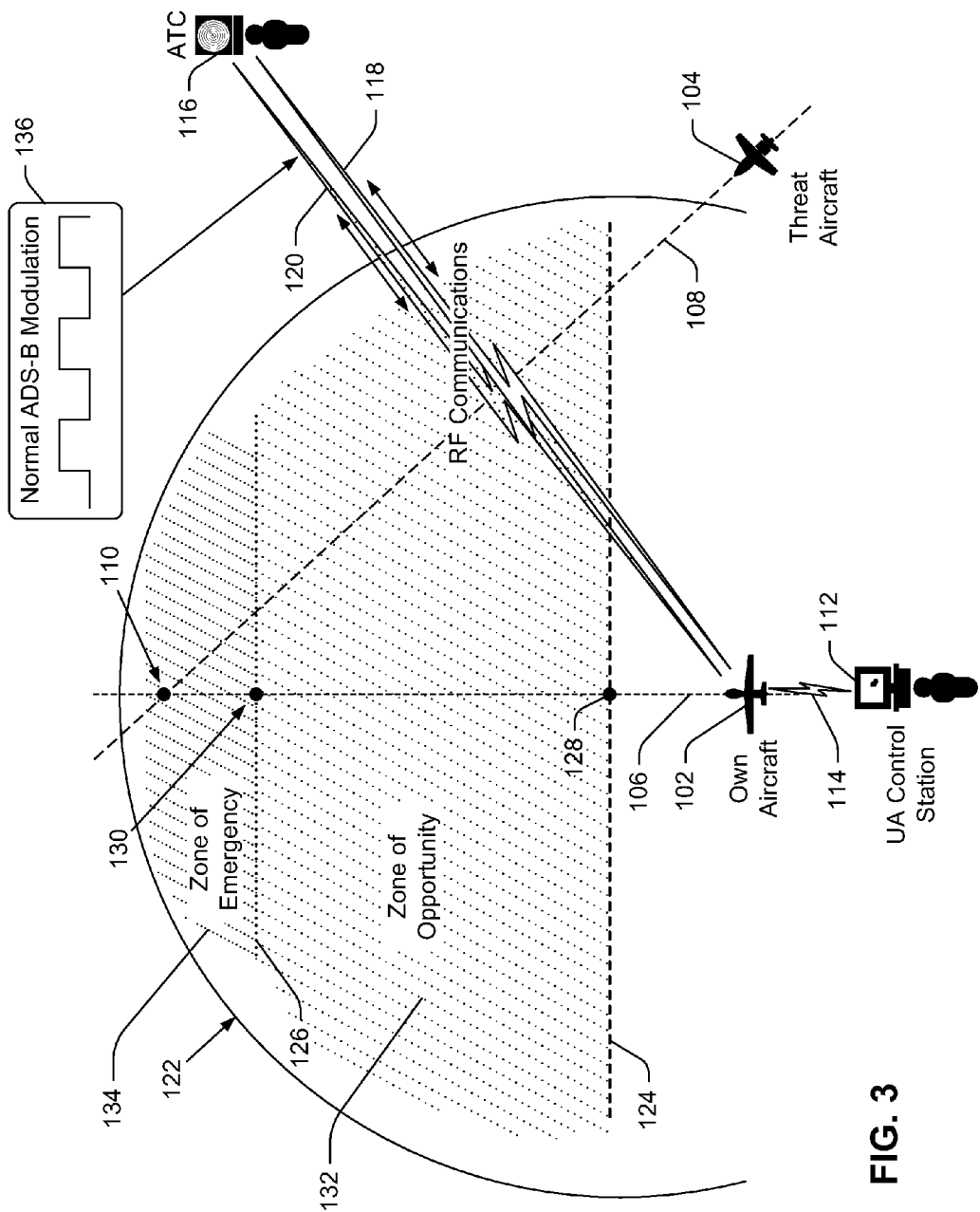
FIGS. 3-7 illustrate different phases of an example operational sequence for performing a compliant self-separation maneuver using ADS-B communication.

FIGS. 3 through 8 show a sequence of diagrams depicting the operation and communications of an unmanned vehicle (UA) in accordance with several examples. In FIG. 3, UA 102, labeled "Own Aircraft," and non-cooperative aircraft 104, labeled "Threat Aircraft," have respective planned flight paths 106, 108 that intersect at a predicted point of collision 110. UA 102 can correspond to unmanned aircraft 12 in FIG. 1 and/or the "performing aircraft" described above with respect to the method in FIGS. 2A-2B. In the illustrated scenario, the flight path 106 of UA 102 is an as-filed IFR flight path, and UA 102 has good communications with local air traffic control (ATC) station 116 over bidirectional links that can include include traditional voice communications channel(s) 118 as well as ADS-B link 120 using normal ADS-B modulation, as illustrated in callout 136. ADS-B link 120 can correspond to link 16 in FIG. 1 and can consist of one or more bidirectional digital communications path(s) and/or channel(s).

In some circumstances UA 102 may be in communication with a UA control station 112 via a wireless communication path 114, which in many cases may not be a line-of-sight communication path. UA 102 and its control station 112 may be separated by arbitrary distances, and in some instances may be continents apart. As such, responsive communications over communication path 114 are not guaranteed, owing to reliability issues inherent to long-distance communication as well as to increasing demands placed on RF bandwidth by an expanding number of aircraft, including unmanned aircraft, operating in the skies, each requiring its own RF communications channel(s). Consequently, communications between UA 102 and control station 112 may be delayed or may become unavailable for periods of time.

When UA 102 may be in communication with its control station 112, control station 112 may relay voice communication to local ATC 116 through UA 102. Absent the appropriate and reliable link 114, such voice communications may not be reliably relayed between UA control station 112 and local ATC 116 and thus UA 102 may not be able to operate within the requirements of the applicable regulatory scheme should the need to deviate from its flight plan arise, for example, due to conflicting flight paths 106, 108.

UA 102 may receive information indicative of the flight paths of other nearby craft, including flight path 108 of non-cooperative aircraft 104, from control station 112, local ATC 116, non-cooperative aircraft 104 itself, or another source. Additionally or alternatively, sensors on UA 102, including a number of video cameras, radar detectors, lidar detectors, or the like, may detect the presence and path of travel of nearby flying craft, including non-cooperative aircraft 104. UA 102 may also include one or more systems, including processor-based systems, capable of estimating or predicting the flight path 108 of non-cooperative aircraft 104 based on received or sensed information. A range from UA 102 within which UA 102 detects or receives information about the paths of nearby aircraft defines surveillance volume 122.

FIG. 3 illustrates as broken lines two thresholds within the surveillance volume. The first demarcates a self-separation maneuver threshold 124, while the second demarcates a "last chance" collision-avoidance threshold 126. Between the two thresholds lies a "zone of opportunity" 132 within which the UA 102 can make a safe and non-intrusive "self-separation" maneuver that is compliant with the prevailing IFR operating rules of the airspace's jurisdiction, for example, U.S. Federal Aviation Administration (FAA) rules. As noted previously, permission generally must be requested and granted for a deviation from the filed flight plan except in an emergency. Thus, UA 102 must ask local ATC 116 for clearance to maneuver within the zone of opportunity 132. Beyond the "last-chance" collision-avoidance threshold 126 lies a zone of emergency 134 within which a course change action is required to avoid a likely imminent collision.

The point 128 at which the flight path 106 of UA 102 intersects the self-separation maneuver threshold 124 constitutes a point 128 along the flight path 106 at which a "self-separation" maneuver should be executed to de-conflict without causing an upset to the shared airspace and in order to comply with prevailing IFR operating rules, for example, U.S. Federal Aviation Administration (FAA) rules. The point 130 at which the flight path 106 of UA 102 intersects the "last-chance" collision-avoidance threshold 126 constitutes a point 130 along the flight path 106 at which an absolute "last chance" collision avoidance maneuver must be executed by UA 102 to avoid a collision with non-cooperative aircraft 104.

As illustrated in FIG. 3, non-cooperative aircraft 104 is still outside the surveillance volume 122. Consequently, at the stage of the flight progression illustrated in FIG. 3, UA 102 may not yet determine that non-cooperative aircraft 104 poses a collision threat, and no action may yet be required of UA 102. UA 102 thus may continue on its IFR flight plan 106, fully compliant with IFR rules.

Figure 4:
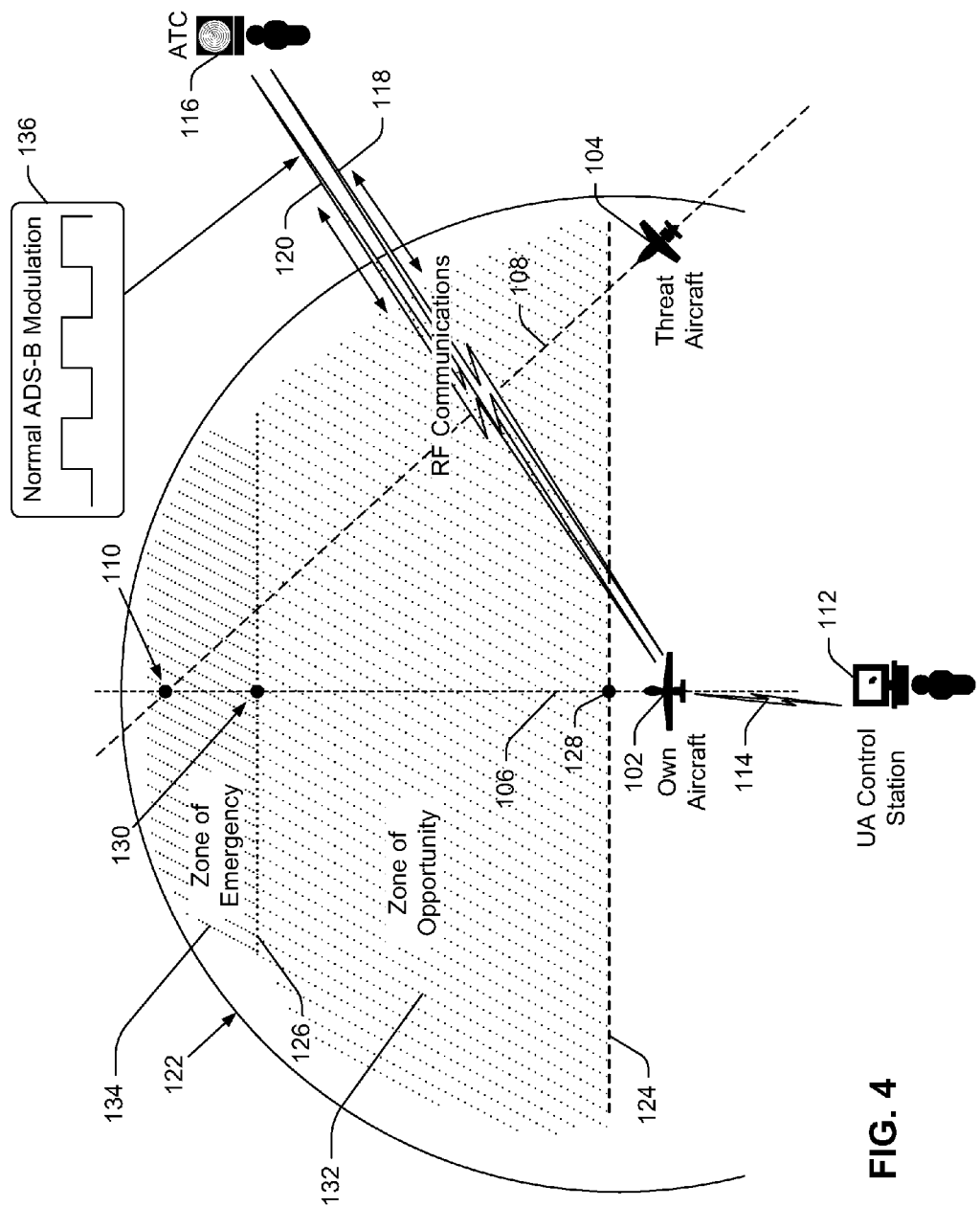

FIG. 4 shows a later stage in the sequence when non-cooperative aircraft 104 has entered the surveillance volume 122. Consequently, automatic on-board system of UA 102 can determine a potential collision threat posed by non-cooperative aircraft 104 and evaluate possible de-conflicting maneuver options. Automatic on-board system can further appreciate the need to communicate with local ATC 116 to request permission to deviate from flight plan 106. In the stage illustrated in FIG. 4, UA 102 may still be on its IFR flight path 106 in full compliance with IFR rules, may still have good communications with its local ATC 116 over both bidirectional links 118, 120, and may still communicate with local ATC 116 over link 120 using normal ADS-B modulation 136.

Figure 5:
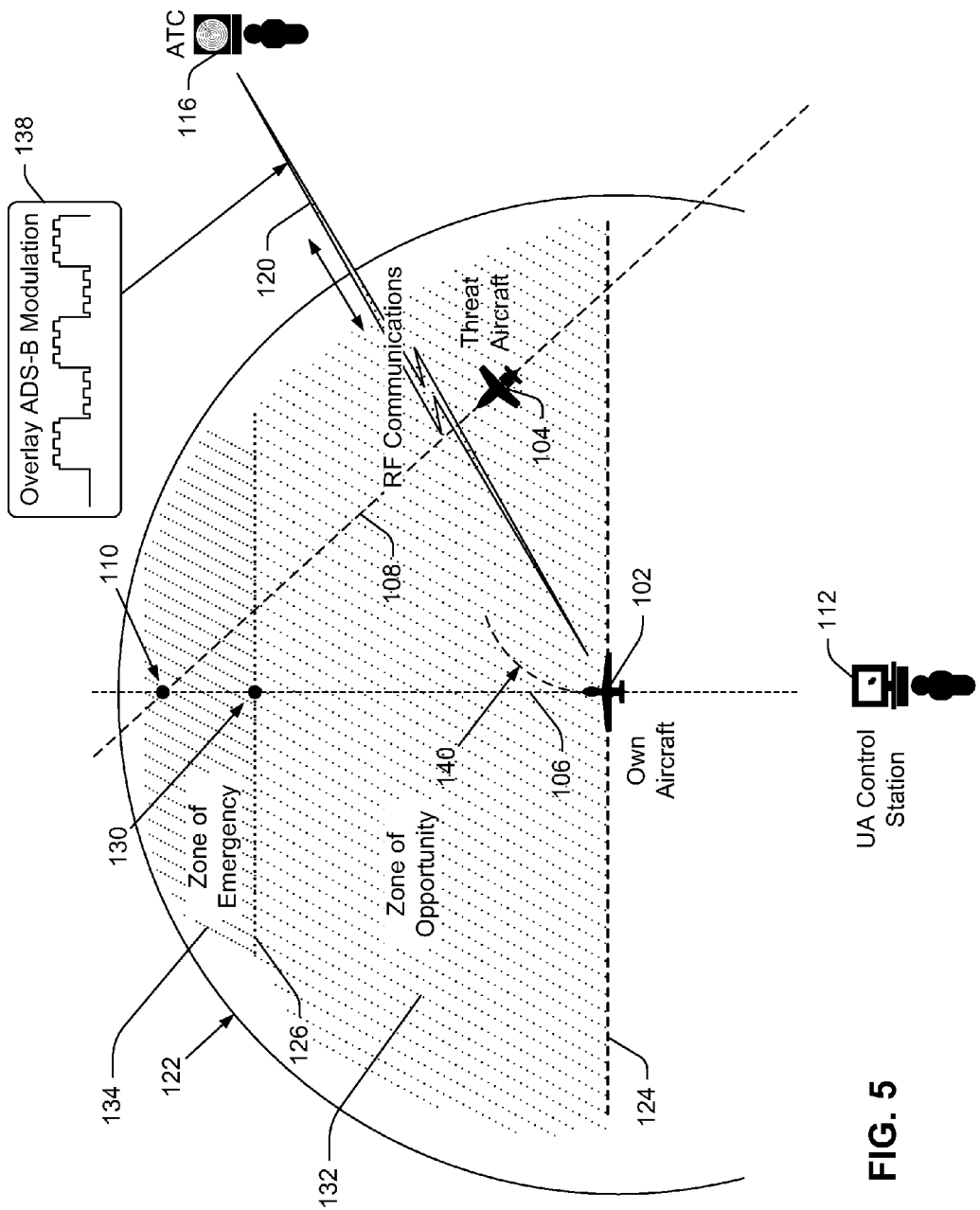

FIG. 5 shows a later stage in the sequence when de-confliction is required in the absence of good communication between UA 102 and its control station 112 and thus between UA 102 and ATC 116. This "absence of good communication" can prevent transmission of voice messages from UA control station 112 to local ATC 116 via UA 102, and can occur for any number of reasons. One reason may be communications tension caused by crowding of communications channel bandwidth resources, preventing proper communication between UA control station 112 and UA 102. Another cause of poor or non-existent communication may be interference or jamming. Another cause may be equipment failure, power outages, or the like at control station 112. Another reason may be a disparity between the number of unmanned aircraft being flown at any one time and corresponding operational personnel at control station 112, which may cause control station 112 to elect to focus on certain unmanned aircraft assets over others, leaving the unattended unmanned aircraft to "fend for themselves" as autonomous craft. Whatever the reason for the absence of good communication between UA 102 and control station 112 in the illustrated scenarios, it is assumed that conditions are not amenable for a UA controller at control station 112 to request permission from ATC 116 for deviations in the flight plan of UA 102.

Thus, in FIG. 5, although UA 102 is still on its IFR flight path 106, UA 102 may have crossed the "self-separation" maneuver threshold 124 and may now be required to perform a de-conflicting maneuver to prevent an upset to the airspace and a forced required intrusive "last-chance" collision-avoidance maneuver. Owing to communications channel loss, UA 102 may be unable to contact ATC 116 using convention voice channel methods to ask for permission to conduct de-conflicting maneuver 140 as proposed. However, UA 102 may still have a good communications path to ATC over ADS-B link 120. Under such communications loss conditions, UA 102 can autonomously issue a message to ATC 116 on the ADS-B overlay requesting permission to maneuver as proposed, and await a response from ATC 116. ATC 116 may be equipped with ATC system 14 in FIG. 1 for the purpose of receiving and understanding the ADS-B overlay message from UA 102.

As depicted in callout 138 in FIG. 5, the overlay sub-modulation can occur on top of an existing ADS-B message. The overlay sub-modulation takes advantage of the basically square-wave shape of the primary ADS-B modulation to overlay a secondary modulation on the flat areas of the primary modulation. As such, the communication from UA 102 need not affect any primary ADS-B communications. At this stage, UA 102 continues on its IFR flight plan 106 but may propose its de-conflicting maneuver 140 to ATC 116. UA 102 may still be fully compliant with IFR rules.

Figure 6:
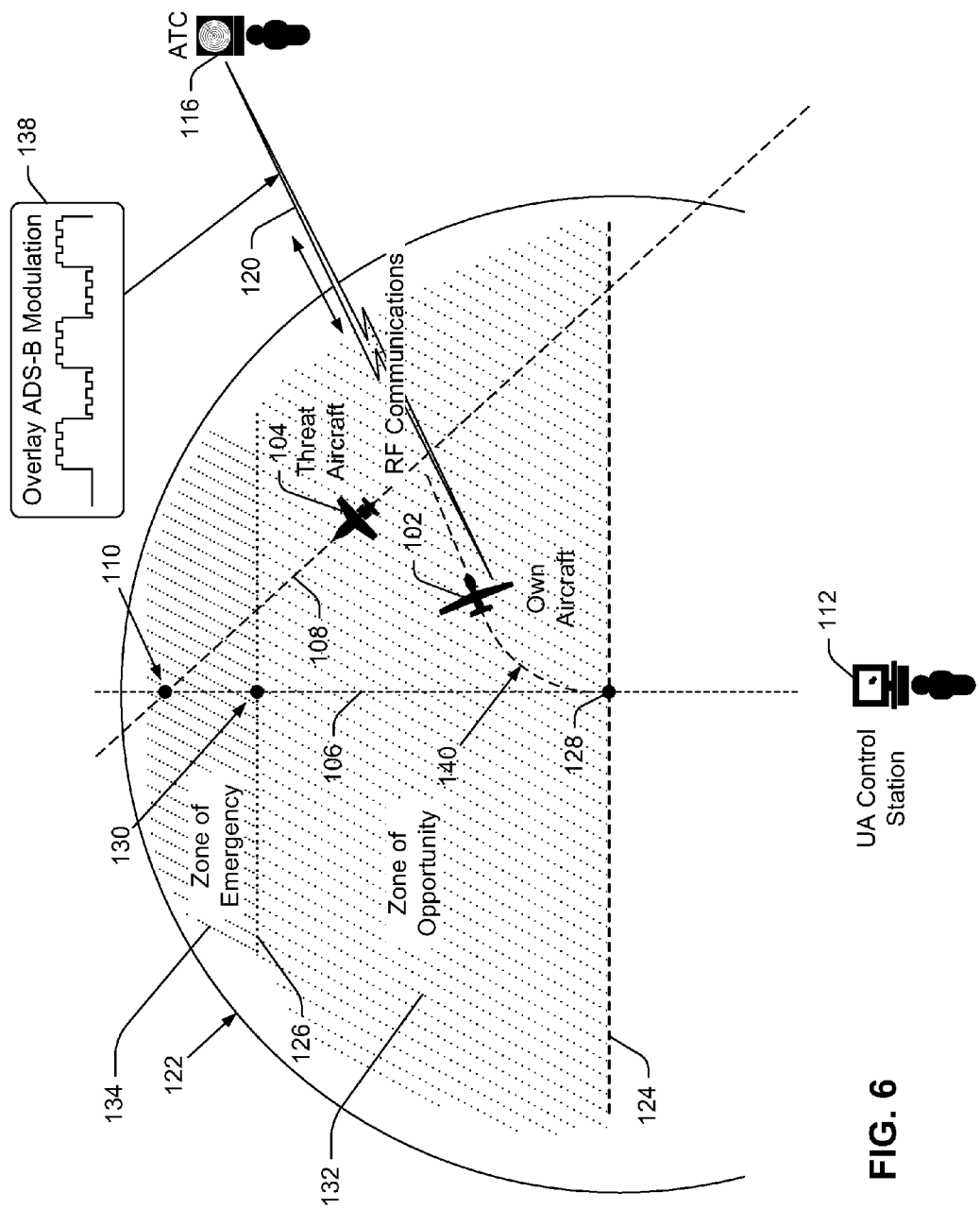

FIG. 6 shows a later stage in the sequence when UA 102 receives permission from ATC 116 to conduct its proposed de-conflicting maneuver 140. UA 102 therefore can make the ATC-approved deviation 140 from the IFR flight plan as filed. As in the previous stage, UA 102 may have lost traditional communications with ATC 116. However, UA 102 may still have a good communications path to ATC over ADS-B link 120. UA 102 can buffer events to advise its operator at UA control station 112 once communications are re-established. At this stage, UA 102 may still be fully compliant with IFR rules.

Once UA 102 determines that its route is clear of conflict with non-cooperative aircraft 104, UA 102 can report this "clear-of-conflict" condition to ATC 116, and can request to resume navigation to the original course 106 as filed, using the overlay ADS-B submodulation scheme 138 over ADS-B communications link 120, even under conditions of traditional communications loss. Subsequently, the ATC 116 can transmit approval of the request to resume navigation to the original course 106 as filed, again using the overlay ADS-B submodulation scheme 138 over ADS-B communications link 120.

Figure 7:
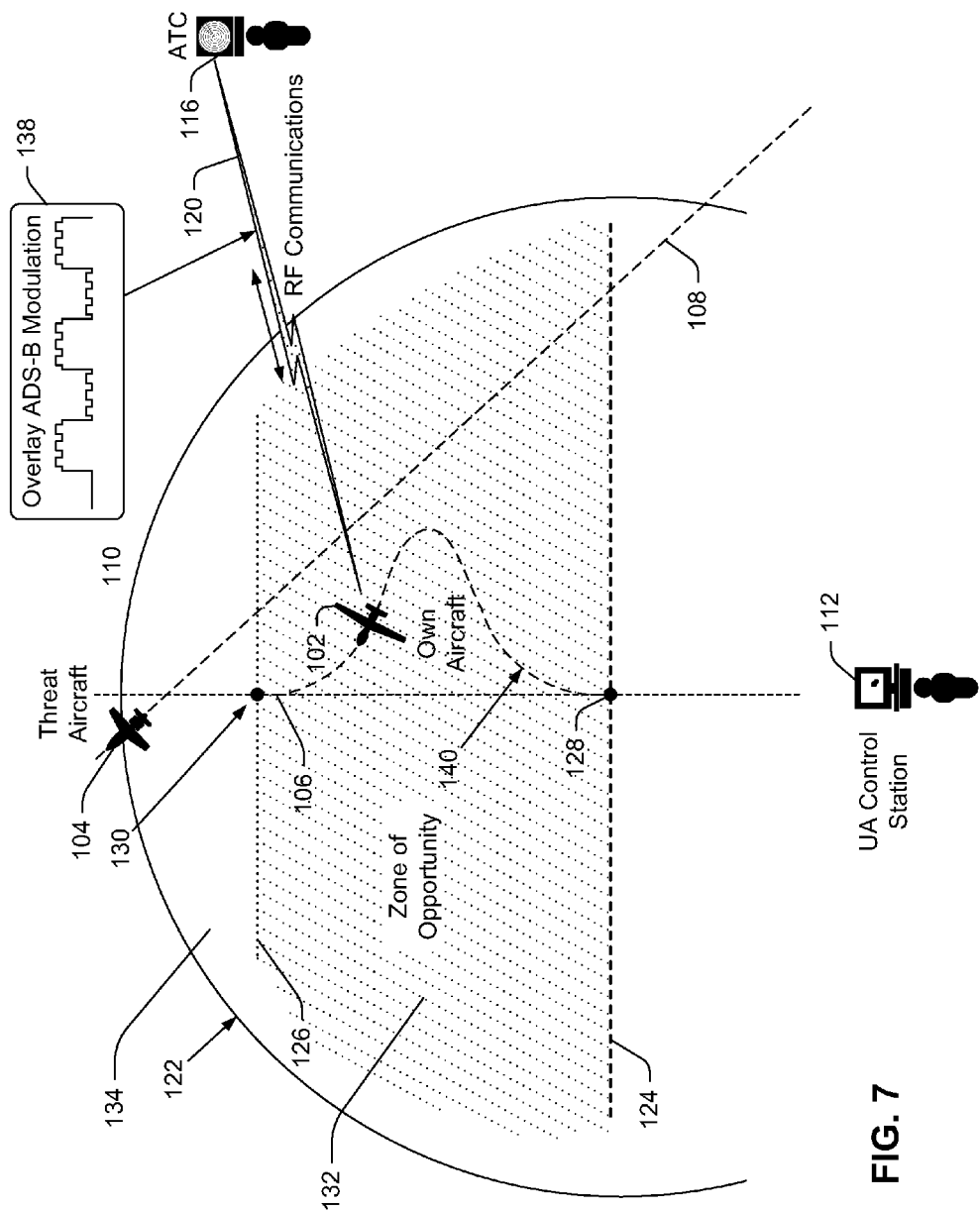

FIG. 7 shows the stage in the sequence when UA 102 maneuvers to resume its original course 106 as filed, having received permission to do so from ATC 116. Non-cooperative aircraft 104 may still be in the surveillance volume 122 but is clear of conflict. Regulations may require the on-board navigation system of UA 102 to resume its original course 106. As in the previous stage, UA 102 may have lost traditional communications with ATC 116. However, UA 102 may still have a good communications path to ATC over ADS-B link 120. UA 102 may continue to buffer events to advise its operator at UA control station 112 once communications are re-established. At this stage, UA 102 may still be fully compliant with IFR rules.

Figure 8:
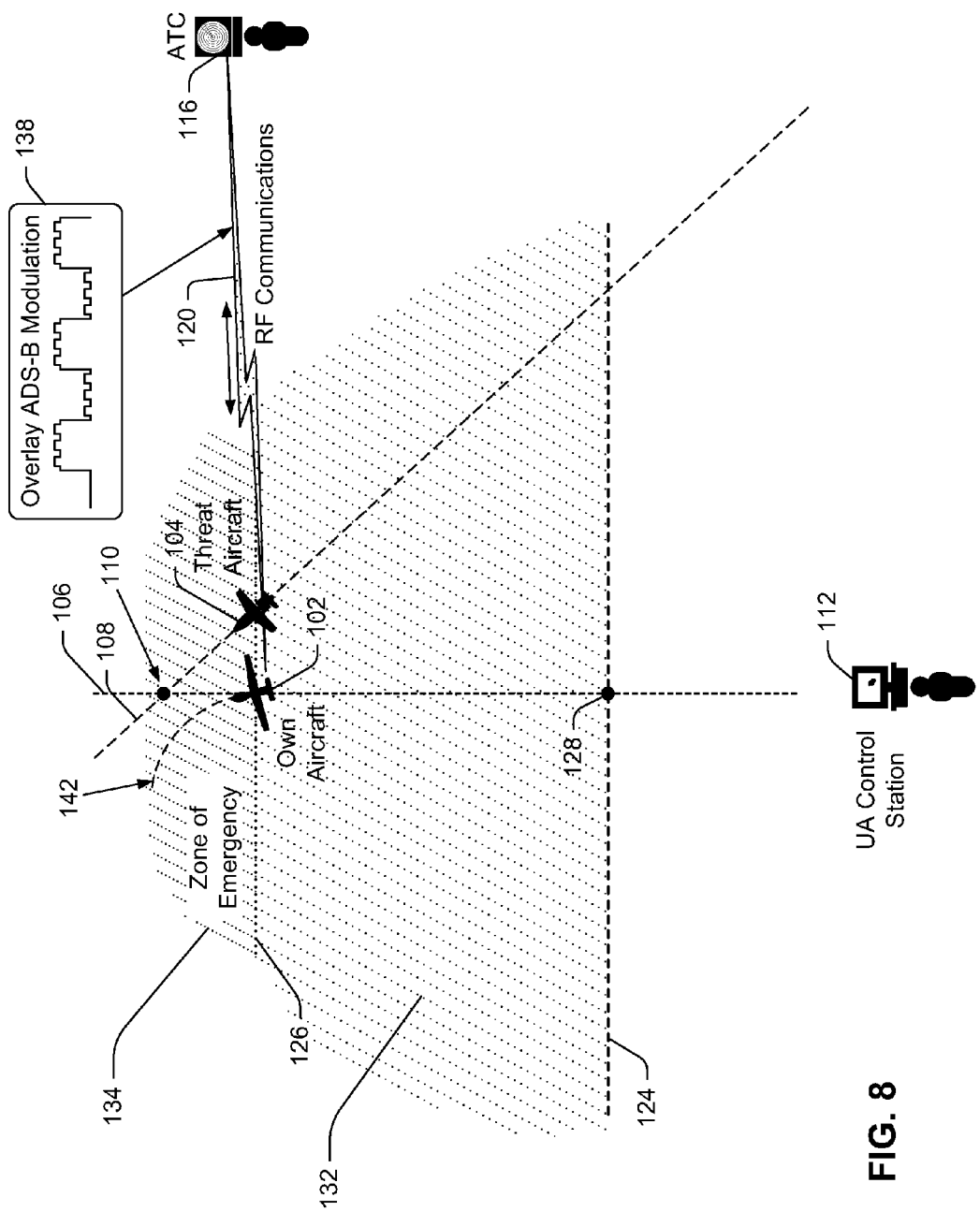
FIG. 8 illustrates a phase in the operational sequence involving an emergency collision-avoidance maneuver using ADS-B communication.

Departing from the sequence of FIGS. 6 and 7, FIG. 8 depicts a scenario where UA 102 does not receive permission from ATC 116 to conduct its proposed de-conflicting maneuver. As illustrated, non-cooperative aircraft 104 is in the collision volume 134 labeled "zone of emergency." Automatic on-board system of UA 102 may now be required to invoke a last-chance collision-avoidance maneuver. However, ATC 116 has not approved any deviation from the IFT flight plan 106 at this time. Even with no maneuver permission from ATC 116, UA 102 can autonomously invoke a last-chance collision-avoidance maneuver 142 to prevent a collision with non-cooperative aircraft 104. Until UA 102 receives an acknowledgment from ATC 116, UA 102 may continuously advise ATC 116 of the required maneuver 142 to avoid a collision. UA 102 may also autonomously resume course 106 once the threat of collision has abated. UA 102 may have lost traditional communications with ATC 116. However, UA 102 may still have a good communications path to ATC over ADS-B link 120. Thus, any update messages from UA 102 to ATC 116 may be sent using the overlay ADS-B submodulation scheme 138 over ADS-B communications link 120.

As shown in FIG. 8, the UA 102 will maneuver to preserve safe flight and will not allow an event to propagate to a collision in the event that permission for route deviation cannot be obtained from ATC 116. UA 102 may buffer events to advise its operator at UA control station 112 once communications are re-established. At this stage, UA 102 may not be compliant with IFR rules as a result of deviating from its filed flight plan without ATC permission.

An aircraft need not be unmanned, and need not be entirely denied voice-link, line-of-sight communications between the aircraft and its local air traffic controller, to benefit from the described methods and systems. The systems and methods described herein can also be beneficial in any aircraft where autonomous navigation and communications capabilities are desired. Moreover, the methods and systems need not require a wholly or partially human-operated ATC, but may be beneficial where ATC is partially or wholly automated to receive, analyze, and approve or disapprove course deviation permission requests and transmit such approval, disapproval, or modified maneuver instructions. The digital communication of the present disclosure can be integrated into a master ATC traffic management computer without the need for human ATC intervention. Under such circumstances, the aircraft making use of the described systems or methods may automatically request and receive maneuver permissions without any ATC human intervention.

Still further, the systems and methods described herein may also be beneficial where conflict-presenting aircraft are not wholly non-cooperative. The described systems and methods can be used to coordinate de-confliction and collision avoidance as between two aircraft, including autonomous aircraft, equipped with the ability to communicate using overlay ADS-B modulation as described.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

I claim:

1. A method comprising:
   formulating a request to an air traffic controller for permission to perform a proposed right-of-way compliant self-separation maneuver;
   modulating a first primary Automatic Dependent Surveillance-Broadcast (ADS-B) signal with a first secondary signal such that the first primary ADS-B signal is not interfered with, the first secondary signal including data characterizing the request;
   transmitting a first ADS-B message comprising the first primary signal and the first secondary signal; and
   waiting a time for receipt of a message indicating air traffic control approval to perform the self-separation maneuver.

2. The method of claim 1, further comprising, prior to the waiting:
   modulating a second primary ADS-B signal with a second secondary signal such that the second primary ADS-B signal is not interfered with, the second secondary signal including data characterizing the proposed maneuver or an executed maneuver;
   transmitting a second ADS-B message comprising the second primary signal and the second secondary signal.

3. The method of claim 1, further comprising receiving the approval as an ADS-B overlay message encoded within an ADS-B message.

4. The method of claim 1, further comprising:
   executing the self-separation maneuver upon receipt of the approval message;
   formulating a request to the air traffic controller for permission to perform a course resumption maneuver;
   modulating a second primary ADS-B signal with a second secondary signal such that the second primary ADS-B signal is not interfered with, the second secondary signal including data characterizing the course resumption maneuver permission request;
   transmitting a second ADS-B message comprising the second primary signal and the second secondary signal.

5. The method of claim 1, further comprising:
   executing an emergency collision-avoidance maneuver in the absence of an approval message;
   modulating a second primary ADS-B signal with a second secondary signal such that the second primary ADS-B signal is not interfered with, the second secondary signal including data characterizing the collision-avoidance maneuver;

transmitting a second ADS-B message comprising the second primary signal and the second secondary signal.

6. A method comprising:

formulating a request to an air traffic controller for permission to perform a proposed maneuver;

modulating a first primary Automatic Dependent Surveillance-Broadcast (ADS-B) signal with a first secondary signal such that the first primary ADS-B signal is not interfered with, the first secondary signal including data characterizing the request;

transmitting a first ADS-B message comprising the first primary signal and the first secondary signal;

executing the proposed maneuver to avoid an airspace conflict with an aircraft;

waiting a first time until clear of the conflict;

planning a course-resumption maneuver to resume a course held prior to the execution of the proposed maneuver;

modulating a second primary ADS-B signal with a second secondary signal such that the second primary ADS-B signal is not interfered with, the second secondary signal including data characterizing the course-resumption maneuver; and transmitting a second ADS-B message comprising the second primary signal and the second secondary signal.

7. The method of claim 6, further comprising:

receiving an ADS-B overlay message comprising an air traffic control approval to perform the course-resumption maneuver; and executing the course-resumption maneuver.

8. The method of claim 6, further comprising:

waiting a second time to receive an air traffic control approval to perform the course-resumption maneuver;

in the absence of receiving an ADS-B overlay message comprising the air traffic control approval to perform the course-resumption maneuver, repeating one or more times the course-resumption maneuver planning, modulating, transmitting, and waiting for air traffic control approval, the number of times based at least in part on whether the conflict-avoidance maneuver was a self-separation maneuver or an emergency collision-avoidance maneuver; and executing the last-planned course-resumption maneuver in the absence of receiving an ADS-B overlay message comprising the air traffic control approval to perform the last-planned course-resumption maneuver.

9. The method of claim 6, wherein the proposed maneuver is a right-of-way compliant self-separation maneuver.

10. The method of claim 6, wherein the proposed maneuver is executed in absence of receipt of a message indicating air traffic control approval to perform the proposed maneuver.

11. An unmanned aircraft comprising:

an onboard Automatic Dependent Surveillance-Broadcast (ADS-B) communication system comprising:

at least one input from a satellite navigation system to provide position and trajectory information;

an ADS-B overlay communication system to encode a maneuver permission request and planned maneuver information as an ADS-B overlay message modulated on top of a primary ADS-B message without interfering with the content of the primary ADS-B message; and at least one radio frequency transmitter or at least one output to a radio frequency transmitter to transmit the ADS-B message including the ADS-B overlay message;

a maneuver planning system to plan maneuvers, the maneuver planning system communicatively coupled to the ADS-B communication system to communicate the planned maneuver information; and one or more onboard sensors selected from one or more of a video camera, a radar detectors, or a lidar detector, the one or more onboard sensors communicatively coupled to the maneuver planning system to provide the maneuver planning system with information about potential airspace conflicts or collision threats.

12. A system comprising:

an onboard Automatic Dependent Surveillance-Broadcast (ADS-B) communication system comprising:

at least one input from a satellite navigation system to provide position and trajectory information;

an ADS-B overlay communication system to encode a maneuver permission request and planned maneuver information as an ADS-B overlay message modulated on top of a primary ADS-B message without interfering with the content of the primary ADS-B message; and at least one radio frequency transmitter or at least one output to a radio frequency transmitter to transmit the ADS-B message including the ADS-B overlay message; and a maneuver planning system communicatively coupled to the onboard ADS-B communication system to detect a need to perform a de-conflicting maneuver or a collision avoidance maneuver, to plan the de-conflicting maneuver or a collision avoidance maneuver, and to communicate the maneuver to the ADS-B communication system for encoding as the ADS-B overlay message.

13. The system of claim 12, wherein the ADS-B communication system is configured to receive and decode ADS-B overlay messages from an air traffic controller and communicate the content of the messages to the maneuver planning system.

14. The system of claim 12, further comprising one or more onboard sensors selected from one or more of a video camera, a radar detectors, or a lidar detector, the one or more onboard sensors communicatively coupled to the maneuver planning system to provide the maneuver planning system with information about potential airspace conflicts or collision threats.

15. An air traffic control system comprising:

a digital interface to receive and decode an Automatic Dependent Surveillance-Broadcast (ADS-B) message comprising at least one primary message and at least one secondary message, the secondary message encoded as an ADS-B overlay message sub-modulated within the primary message, the secondary message comprising at least a maneuver permission request;

one or more automated translators to convert the decoded secondary message to a language or format understandable as a maneuver permission request by a human ATC operator or an automated ATC system.

16. The system of claim 15, further comprising at least one of an auditory speaker or a visual display to output the converted secondary message.

17. The system of claim 15, wherein the secondary message is converted into one or more of a text message, a voice alert, or a visual indicator of a proposed maneuver or course change understandable as a maneuver permission request by a human ATC operator.

18. The system of claim 17, wherein the secondary message is converted into a human-language voice alert resembling a voice communication request for maneuver permission from a human pilot.

19. The system of claim 15, wherein the digital interface is configured to receive an input indicative of grant or denial of permission to perform a proposed maneuver, encode the input as an ADS-B overlay message submodulated on top of an ADS-B message, and transmit the ADS-B message.

20. The system of claim 19, wherein the system comprises a speech recognition system and the input is a human-language voice input indicative of the permission grant or denial.

* * * * *